(12) United States Patent
Sentmanat (10) Patent No.: US 8,562,217 B2
(45) Date of Patent: Oct. 22, 2013

(54) COMPACT NON-CONTACT MECHANICAL COUPLING, DAMPING AND/OR LOAD BEARING DEVICE

(75) Inventor: Martin Sentmanat, Akron, OH (US)

(73) Assignee: Smartin Technologies LLC, Spicewood, TX (US)

( * ) Notice: Subject to any disclaimer, the term of this patent is extended or adjusted under 35 U.S.C. 154(b) by 592 days.

(21) Appl. No.: 12/682,243

(22) PCT Filed: Oct. 9, 2008

(86) PCT No.: PCT/US2008/079381
§ 371 (c)(1),
(2), (4) Date: Jul. 12, 2010

(87) PCT Pub. No.: WO2009/049070
PCT Pub. Date: Apr. 16, 2009

(65) Prior Publication Data
US 2010/0284637 A1    Nov. 11, 2010

Related U.S. Application Data

(60) Provisional application No. 60/978,453, filed on Oct. 9, 2007.

(51) Int. Cl.
*F16C 32/06* (2006.01)
*F16C 25/02* (2006.01)

(52) U.S. Cl.
USPC ............ 384/100; 384/116; 384/123; 384/273

(58) Field of Classification Search
USPC ......... 384/100, 107, 111–112, 131–133, 307, 384/322, 116, 123
See application file for complete search history.

(56) References Cited

U.S. PATENT DOCUMENTS

| 3,865,442 | A  |   | 2/1975  | Studer |
| 4,257,254 | A  | * | 3/1981  | Adamus et al. ................. 72/432 |
| 6,296,391 | B1 | * | 10/2001 | Hayakawa et al. ........... 384/119 |
| 6,316,857 | B1 | * | 11/2001 | Jeong ............................ 384/107 |
| 6,361,214 | B1 | * | 3/2002  | Ichiyama ...................... 384/107 |
| 6,574,186 | B2 | * | 6/2003  | Nii et al. ....................... 369/269 |
| 6,717,310 | B2 | * | 4/2004  | Yoshikawa et al. ........... 384/107 |

(Continued)

FOREIGN PATENT DOCUMENTS

| DE | 3823978 A1 | 1/1990 |
| EP | 0429155 A1 | 5/1991 |

(Continued)

OTHER PUBLICATIONS

International Search Report for Application No. PCT/2008/079381 dated May 19, 2009 (11 Pages).

*Primary Examiner* — Marcus Charles
(74) *Attorney, Agent, or Firm* — Judy M. Mohr; Jacqueline F. Mahoney; McDermott Will & Emery LLP (57) ABSTRACT

A compact, noncontact mechanical coupling, damping, and/or load bearing device comprising an internal load bearing member and an external load bearing member that are mated in an interdigitated relation while maintaining a gap therebetween is described. In some embodiments, the gap between the internal and external load bearing members is maintained by hydrostatic means, hydrodynamic means, electrorheological fluids, magnetorheological fluids, electric fields, and/or magnetic fields.

17 Claims, 13 Drawing Sheets

(56) References Cited

U.S. PATENT DOCUMENTS

| | | |
|---|---|---|
| 6,768,236 B2 * | 7/2004 | Tokunaga et al. .............. 384/112 |
| 6,787,954 B2 * | 9/2004 | Yoshitsugu et al. ........... 384/132 |
| 6,914,358 B2 * | 7/2005 | Tokunaga et al. ................ 310/90 |
| 7,092,203 B2 * | 8/2006 | Inoue et al. .................... 384/110 |
| 2002/0065171 A1 * | 5/2002 | Raber ............................ 477/175 |
| 2002/0190590 A1 * | 12/2002 | Watanabe et al. ................ 310/90 |
| 2006/0018576 A1 | 1/2006 | Kusaka et al. |
| 2006/0072242 A1 | 4/2006 | Tamaoka |
| 2006/0255677 A1 * | 11/2006 | Takehara et al. ......... 310/156.43 |

FOREIGN PATENT DOCUMENTS

| | | | |
|---|---|---|---|
| GB | 1471843 | A | 4/1977 |
| GB | 2083595 | A | 3/1982 |
| JP | 35-24907 | B | 9/1960 |
| JP | 01003318 | A * | 1/1989 |
| JP | 4-191518 | A | 7/1992 |
| JP | 11-230297 | A | 8/1999 |
| JP | 2000192979 | A * | 7/2000 |
| JP | 2002-100666 | A | 4/2002 |
| JP | 2002-257132 | | 9/2002 |
| JP | 2006-170415 | | 6/2006 |

\* cited by examiner

COMPACT NON-CONTACT MECHANICAL COUPLING, DAMPING AND/OR LOAD BEARING DEVICE

I. REFERENCE TO RELATED APPLICATIONS

This application is a U.S. National Stage of International Patent Application No. PCT/US2008/079381, filed Oct. 9, 2008, which claims the benefit of U.S. Provisional Application No. 61/978,453, filed Oct. 9, 2007, all of which are hereby incorporated by reference in their entirety.

II. BACKGROUND OF THE INVENTION

A. Field of Invention

This disclosure generally relates to devices such as bearings, and couplings, damping devices and related methods; and to methods and apparatuses related to compact non-contact mechanical bearings, couplings, and damping devices.

B. Description of the Related Art

Load bearing, damping and mechanical coupling devices are known in the art. For instance, some well known bearing types include radial bearings, thrust bearings, hydrodynamic bearings, hydrostatic bearings; and some well known types of mechanical coupling devices include clutches. Prior devices are limited in terms of the amount of load they are capable of bearing. In part, the limitation arises from limited load bearing surface area.

It is known to use two bearings in series to increase stiffness, for instance, in hydrodynamic bearings used in hard disk drives. According to some prior arrangements, a gap between two opposing hydrodynamic bearing surfaces is maintained when the bearing is not moving. More specifically, some prior arrangements use embedded magnets disposed in opposing hydrodynamic surfaces to maintain the gap. However, such arrangements have inherently low loading capacities due in part to the low magnetic field strength that is achievable with embedded magnets.

Accordingly, there is a need in the art for a compact device having high surface area and a large loading capacity.

III. SUMMARY OF THE INVENTION

According to one embodiment a device can comprise: an internal load bearing member having at least two digits joined by a linking portion, the linking portion defining at least one gap between adjacent digits, the gap having a predetermined thickness; at least one external load bearing member having at least one digit adapted to be received in the at least one gap of the internal bearing element and mate with the internal load bearing member; a means for maintaining the gap between the internal and external load bearing members.

Still other benefits and advantages of the invention will become apparent to those skilled in the art to which it pertains upon a reading and understanding of the following detailed specification.

IV. BRIEF DESCRIPTION OF THE DRAWINGS

The invention may take physical form in certain parts and certain arrangement of parts, embodiments of which will be described in detail in this specification and illustrated in the accompanying drawings which form a part hereof and wherein.

V. DETAILED DESCRIPTION OF THE INVENTION

Disclosed herein is a non-contact mechanical coupling device that can comprise a large load bearing surface area per unit volume. Some embodiments comprise hydrostatic bearings, hydrodynamic bearings, and/or mechanical coupling devices. Further, some embodiments comprise gas bearings, fluid bearings, pressurized or unpressurized bearings, radial bearings, thrust bearings, clutches, shock absorbers, dampers, or the like.

Some embodiments can compactly support much larger loads than traditional non-contact mechanical load bearing, damping and/or coupling devices, and can do so over one or more convoluted load bearing regions. Embodiments can include convoluted load bearing regions, and/or sections that can be sequentially ordered, stacked and/or coaxially annular in configuration in order to accommodate linear and/or rotational motions. Embodiments include a gap between the mating faces of non-contact load bearing surfaces. Furthermore, embodiments can include a means for maintaining the gap such as, without limitation, pressurized or non-pressurized fluid media, electrorheological fluids, magnetorheological fluids, electric fields, and/or magnetic fields and one or more controller devices in electronic controlling communication therewith.

Some embodiments relate to mechanical devices comprising a load bearing member and may allow a load to move relative to the load bearing member. In some embodiments the load bearing member includes a high surface area convoluted internal bearing element, and an external bearing element adapted to mate with the internal element. High mating surface areas can be defined by convoluted mating relations such as, without limitation, interdigitated, ridge/groove, fluted, or corrugated relations or any combination thereof. Some embodiments further include a gap between the mating surfaces of the internal and external bearing elements, wherein the gap spacing is maintained by any of a variety of means including, without limitation, filling the gap with one or more fluids, and/or applying opposing electric and/or magnetic fields to the internal and external bearing elements. Some embodiments can have an overall dimensional scale on the order of picometers ($10^{-12}$) to several meters.

In some embodiments a compact load bearing device having a high loading capacity can comprise bearing elements having a large number of convolutions. In general, load bearing capacity can be increased by increasing the number and/or number density of convolutions. However, according to some embodiments an optimal load bearing capacity per unit volume of the device can be achieved by selecting both an appropriate number and thickness of convolutions. Furthermore, the thickness of the convolutions of any single device can vary within the device according to any appropriate pattern.

The thickness of the convolutions in an internal or external bearing element can vary across a wide range according to the needs of a specific application. For instance, convolutions can range from tens of meters in thickness to picometers in thickness. Some ranges include about 10 m to about 1 m; about 1 m to about $10^{-1}$ m; about $10^{-1}$ m to about $10^{-2}$ m; about $10^{-2}$ m to about $10^{-3}$ m; about $10^{-3}$ m to about $10^{-4}$ m; about $10^{-4}$ m to about $10^{-5}$ m; about $10^{-5}$ m to about $10^{-6}$ m; about $10^{-6}$ m to about $10^{-7}$ m; about $10^{-7}$ m to about $10^{-8}$ m; about $10^{-8}$ m to about $10^{-9}$ m; about $10^{-9}$ m to about $10^{-10}$ m; about $10^{-10}$ m to about $10^{-11}$ m; or even about $10^{-11}$ m to about $10^{-12}$ m. Here as elsewhere in the specification and claims ranges may be combined. Furthermore, the distance between convolutions can be less than, equal to or greater than the thickness of the convolutions. In embodiments where the thickness of the internal and external bearing element convolutions are substantially equal, the distance between the convolutions must be slightly larger than the thickness of the convolutions in order to accommodate a mating convolution and a gap between the mating bearing elements.

The number of convolutions in an internal or external load bearing element can vary across a wide range according to the needs of a specific application. Some ranges include anywhere from 1 to $10^6$ convolutions. Other appropriate ranges include 1 to 10 digits; 10 to $10^2$ convolutions; $10^2$ to $10^3$ convolutions; $10^3$ to $10^4$ convolutions; $10^4$ to $10^5$ convolutions; or $10^5$ to $10^6$ convolutions.

In some embodiments convolutions of the internal and external bearing elements can comprise a planar geometry such as, without limitation, a square plane, a circular plane. Further, bearing elements can define a square, triangular, trapezoidal, or rounded cross section, or any other appropriate cross sectional geometry. According to some embodiments an external bearing member comprising a set of square planar digits can be adapted to mate with an internal bearing member comprising a rail. According to such embodiments, the rail and/or the external bearing member can move linearly relative to each other. In embodiments comprising a circular planar structure the internal and external bearing elements can include one or more through-holes, such as a central through-hole for receiving a thrust member such as a shaft, the assembly comprising a thrust bearing.

In other embodiments digits of the internal and/or external bearing elements can comprise annular members arranged concentrically. For instance, in some embodiments an internal bearing element can comprise a cylindrical or semi-cylindrical member having a longitudinal through hole adapted to receive a cylindrical central bearing element. Walls of the through hole can define a face of a first annular digit of the internal bearing element (e.g. See FIG. 1, element 102(*a*)). A second annular digit of the internal bearing element can be in a coaxial relation with the first annular digit. The first and second annular digits can be spaced apart by a predetermined distance, and the space between them can be adapted to receive a mating digit of the external bearing element in an interdigitated relation. One of skill in the art will recognize that embodiments can comprise any number of such annular digits as desired for a given application.

Still other embodiments can comprise groups of digits, the groups being spatially separated according to a predetermined pattern. For instance, in some embodiments a plurality of bearing, coupling and/or damping elements can be arranged in parallel or in series. Furthermore, in some embodiments one or more bearing, coupling and/or damping elements can be attached to one another according to a predetermined pattern.

According to some embodiments, internal and/or external bearing elements can include digits having one or more structured faces. Structured faces can be adapted, for instance, in hydrodynamic bearings to force liquids or gases into the gap region separating mating bearing elements. For example, some structures can include foils, fins, rotors, impellers, grooves, flutes, or the like.

Internal and external bearing element can comprise any of a wide variety of materials, and the internal and external elements need not comprise the same material. Embodiments comprising electric or magnetic means for maintaining the gap between external and/or internal bearing elements (i.e. electric/magnetic embodiments) can be made from conductive materials. Some materials for fabricating internal and/or external bearing elements can include, without limitation, copper, brass, bronze, aluminum, gold, steel or any combination thereof. In some electric/magnetic embodiments, the internal and/or external bearing elements can comprise semiconductive materials such as, without limitation, silicon, gallium arsenide, gallium nitride or any combination thereof. Still further, in some electric/magnetic embodiments the internal and/or external bearing elements can comprise a non-conductive material coated with one or more conductive and/or semiconductive layers.

Some embodiments comprise a non-electric/magnetic fluid means for maintaining the gap between the internal and external bearing elements (i.e. non-conductive embodiments) and the internal and/or external bearing elements can therefore be made from non-conductive materials. For instance, such embodiments can include bearing elements made from organic polymers, stone, graphite, ceramics, silicates, borates, and the like or any combination thereof.

The external bearing elements can have a wide variety of structural forms, depending upon the specific application. Some embodiments can include substantially non-porous materials adapted to contain liquids and/or gases. Furthermore, in some embodiments the external bearing elements can comprise a porous material. Accordingly, in some embodiments the external bearing element comprises pressed and/or sintered metals. Porous material can be useful, for instance in hydrostatic bearing applications where the fluid disposed between the internal and external bearing elements must be maintained at an elevated pressure, for instance, through pumping. Accordingly, suitable porous material can be adapted to pass gases and/or liquids. One of skill in the art will recognize that a wide variety of porosities can be appropriate depending upon the viscosity of the fluid to be passed, the amount of pressure to be applied, and other factors known to those of skill in the art. Furthermore, one of skill in the art will be able to select an appropriate porosity without undue experimentation.

The gap between the mating surfaces of the internal and external bearing elements can comprise distances ranging from about $10^{-2}$ m to about $10^{-12}$ m. Other ranges can include about $10^{-2}$ m to about $10^{-3}$ m, about $10^{-3}$ m to about $10^{-4}$ m, about $10^{-4}$ m to about $10^{-5}$ m, about $10^{-5}$ m to about $10^{-6}$ m, about $10^{-6}$ m to about $10^{-7}$ m, about $10^{-7}$ m to about $10^{-8}$ m, about $10^{-8}$ m to about $10^{-9}$ m, about $10^{-9}$ m to about $10^{-10}$ m, about $10^{-10}$ m to about $10^{-11}$ m, or even about $10^{-11}$ m to about $10^{-12}$ m.

A fluid for filling the gap between the mating surfaces of the internal and external bearing elements can comprise any of a wide variety of fluids. Some appropriate fluids can comprise oils, non-oil liquids, gases, electrorheological fluids, and/or magnetorheological fluids. Furthermore, the fluids can be either pressurized or non-pressurized according to the needs of any particular application. According to some embodiments oils can comprise any known oil for lubricating machine elements including, without limitation, mineral oil and silicone oil. Furthermore, according some embodiments gaseous fluids can comprise any gas known for use in hydrostatic and/or hydrodynamic bearings.

Some embodiments can include one or more electromagnetic elements having variably controllable power, and magnetic field strength and orientation. Such embodiments can adjust the rheological properties of a magnetorheological fluid disposed in the gap separating the mating surfaces of internal and external bearing elements. Furthermore, adjusting the rheological properties of the magnetorheological fluid can alter the overall damping, viscous, and/or viscoelastic behavior of the embodiment. Accordingly, such embodiments can comprise variable strength non-contact magnetorheological damping devices.

Similarly, some embodiments can include one or more electrode elements whose power; and electrical field charge, strength, and orientation can be variably controlled. Such embodiments can adjust the rheological properties of an electrorheological fluid disposed in the gap separating the mating surfaces of the bearing elements. Furthermore, adjusting the rheological properties of an electrorheological fluid can alter the overall damping, viscous, and/or viscoelastic behavior of the embodiment. Accordingly, such embodiments can comprise variable strength non-contact electrorheological damping devices. Furthermore, some embodiments include a controller for regulating electric and/or magnetic fields associated with the internal and/or external bearing elements. One of skill in the art will appreciate that a wide variety of control means are known in the art and an appropriate means can be selected without undue experimentation.

Some embodiments can include a plurality of compact non-contact bearings and/or mechanical couplings. Such combination embodiments can be arranged in series, in parallel or some portions may be arranged in series while other portions are arranged in parallel. Each element of a combination embodiment can perform one or more coupling or load bearing functions, and can be separately or collectively controlled. In some combination embodiments the elements of the combination can be arranged in a network control structure.

Some embodiments can include one or more safety features that prevent the mating faces of the bearing elements from touching. Such safety features may be actuated by a triggering event such as, without limitation, a large and/or abrupt impulse in the applied load, a failure in fluid pressurization, or a failure of an electric or magnetic field. In some embodiments, safety features can include, without limitation, one or more caged balls, pins, rollers, rolling bearing element assemblies, bushings, springs, struts, repulsively opposed permanent magnets and the like.

Embodiments can be incorporated into a wide variety of devices requiring a bearing, damper, shock absorber, clutch, or braking device, and can be adjusted in shape, form or size to accommodate the specific application. Some embodiments are particularly well-suited for high-precision, low noise, and very low friction bearing applications that are inherently required for research, biomedical, scientific, analytical, computer hardware, electronic, metrology, and MEMS-related instrumentation and devices. Because embodiments have an inherently higher load bearing capacity per unit volume, embodiments can operate at lower pressures, electric, and/or magnetic field strengths for a given application in comparison to conventional devices.

Due to their superior loading capacity, some embodiments can be utilized in applications outside of the operating load range of conventional devices. Some embodiments also improve overall energy efficiency due to the reduction in energy losses associated with friction as compared to conventional devices. Similarly, in comparison to conventional devices, some embodiments can also reduce operating temperatures, start-up loads, transient power spikes, increase maximum operating speeds and dynamic rates, as well as increase a product's overall life and performance at both low and high rates of operation. Hence, some embodiments can also be used in applications historically accessible only to direct contact mechanical load bearing devices. For instance, manufacturing, industrial equipment and machinery, vehicular and transportation systems, and consumer and household goods applications where bearing friction and the issues associated therewith often limit overall product performance and energy efficiency. Furthermore, some embodiments can offer advantages over conventional non-contact devices in applications such as, without limitation, electronic media and data storage hardware, biomedical instrumentation, turbomachinery, jet engines, steam turbine generators, high precision machining, grinding, and the like.

Figure 1:
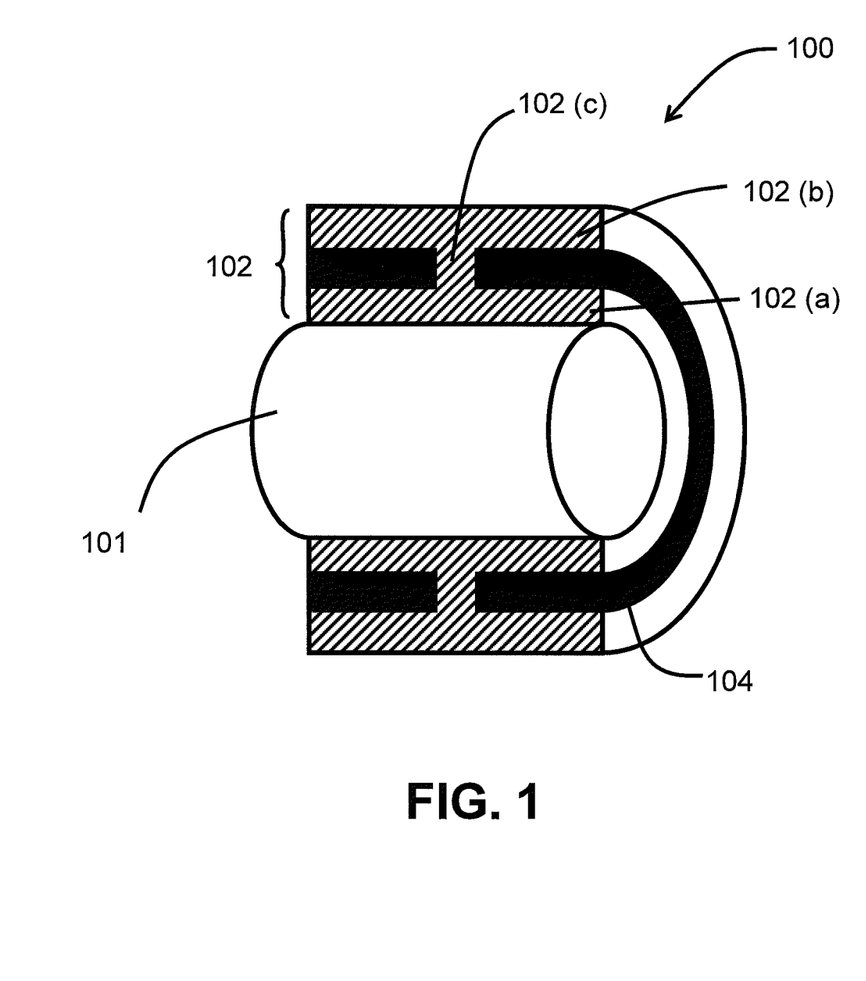
FIG. 1 is a longitudinal cross sectional drawing of a portion of a radial bearing embodiment comprising internal bearing elements.

Referring now to the drawings wherein the showings are for purposes of illustrating embodiments of the invention only and not for purposes of limiting the same, FIG. 1 shows a portion of an embodiment 100 comprising a cylindrical central bearing element 101 received by an internal bearing element 102. In some embodiments the central bearing element 101 and the internal bearing element 102 are mechanically locked together so that they move as a single body. In other embodiments the central bearing element 101 and the internal bearing element 102 move independently, and may produce very little friction between them. According to FIG. 1 the internal bearing element 102 further comprises digits 102(a) and 102(b). Furthermore, the digits 102(a), 102(b) are joined by a centrally located linking portion 102(c). The digits 102(a), 102(b) are spaced apart and define a cavity 104 adapted to receive a mating portion of an external bearing element.

Figure 2:
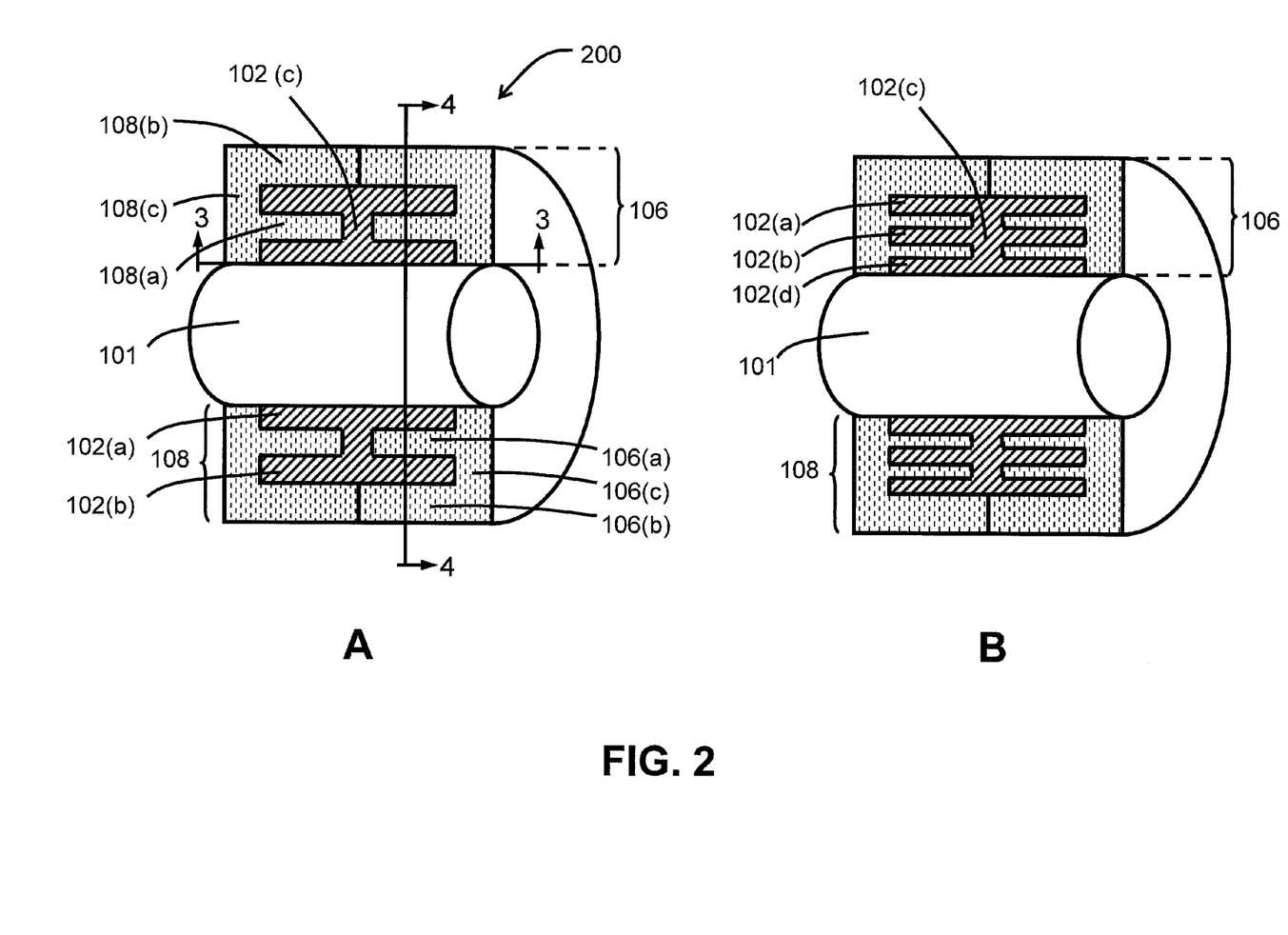
FIG. 2A is a longitudinal cross sectional view of an embodiment including internal and external bearing elements.
FIG. 2B is a longitudinal cross sectional view of an embodiment comprising an internal bearing element having three digits.

FIG. 2A shows an assembly 200 comprising the partial embodiment of FIG. 1 fitted with a pair of external bearing elements 106, 108. A first external bearing element 106 further comprises a pair of digits 106(a) and 106(b) joined by a linking portion 106(c). Furthermore, the digits 106(a) and 106(b) are spaced apart and define a cavity adapted to receive digits of the internal bearing element 102 in an interdigitated mating relation. Similarly, a second external bearing element 108 further comprises a pair of digits 108(a) and 108(b) joined by a linking portion 108(c). Furthermore, the digits 108(a) and 108(b) are spaced apart and define a cavity adapted to receive digits of the internal bearing element 102 in an interdigitated mating relation. FIG. 2B shows a similar embodiment comprising an internal bearing element 102 having three digits 102(a), 102(b), 102(d) that are joined by a centrally located linking portion 102(c). The external bearing elements 106, 108 of FIG. 2B are altered to accommodate the extra digit of the internal bearing element 102. Any number of additional digits can be similarly added.

Figure 3:
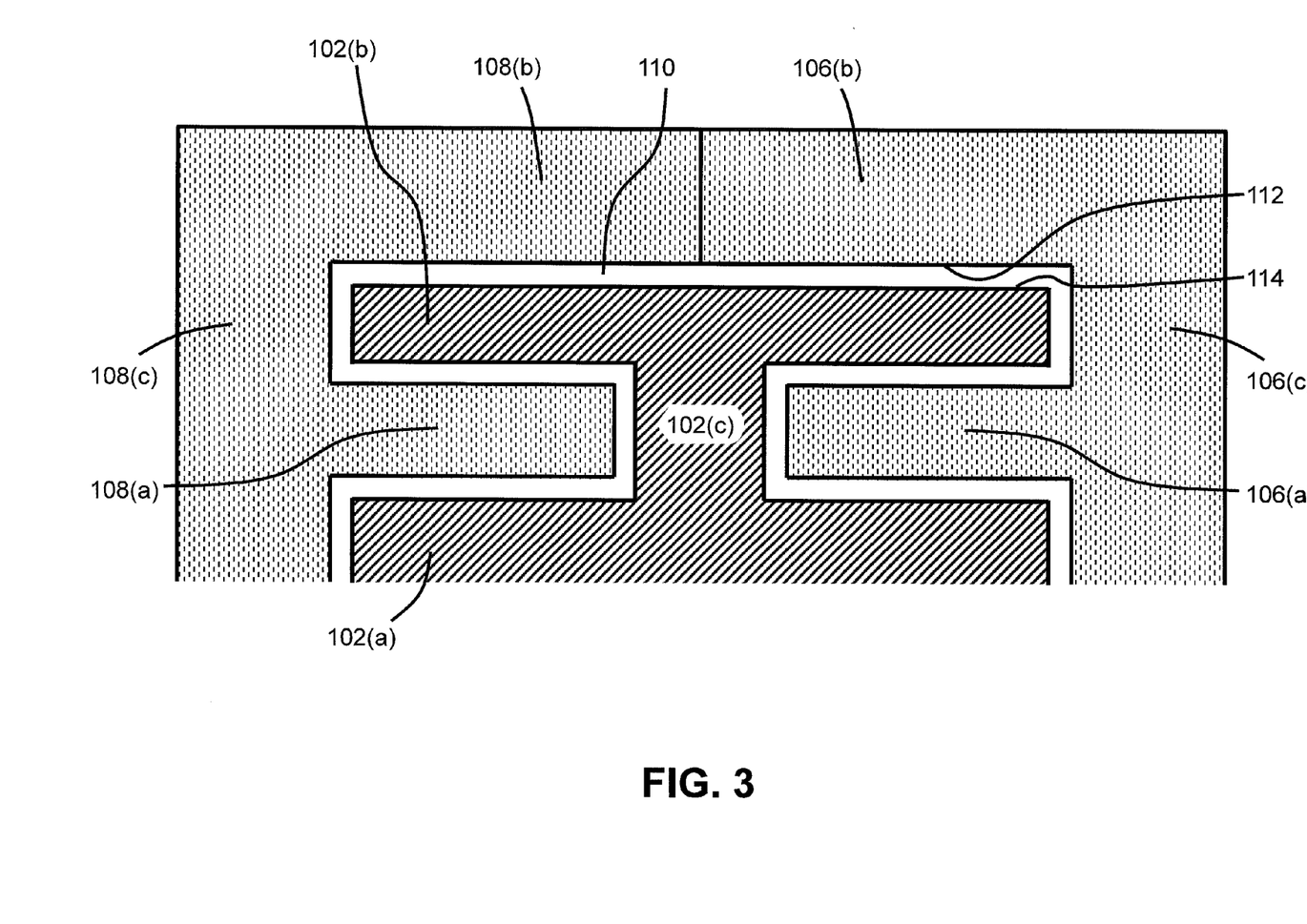
FIG. 3 is a partial cross sectional view taken along line 3-3 of FIG. 2A.
Figure 4:
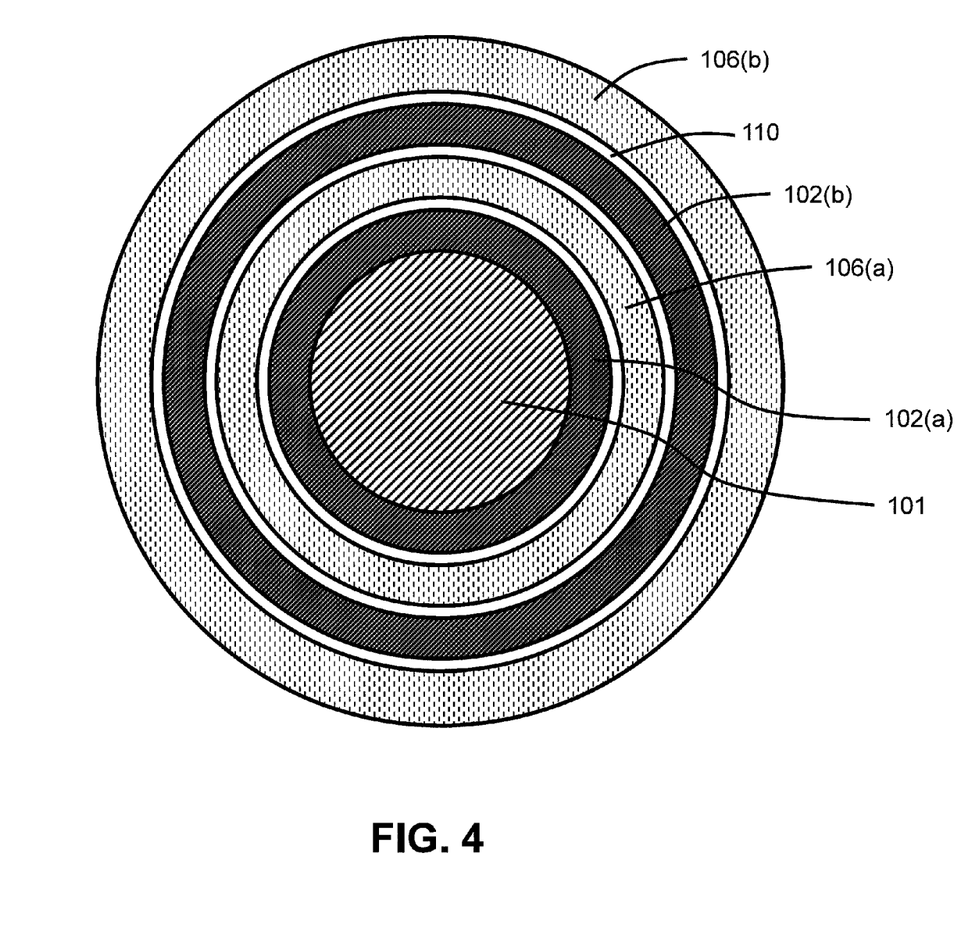
FIG. 4 is a radial cross sectional view taken along line 4-4 of FIG. 2A.

FIG. 3 shows a partial cross sectional view of the internal and external bearing elements of FIG. 2A taken along line 3-3. In this magnified view a gap 110 is shown between the external bearing elements 106, 108 and the internal bearing element 102. Accordingly, the mating faces 112, 114 of the digits defined by the bearing elements are spaced apart defining a gap 110 and do not make contact during operation. This gap 110 can be maintained by filling it with a pressurized or unpressurized fluid, and/or by applying opposing electric or magnetic fields to the internal 102 and external 106, 108 bearing elements. FIG. 4 is a radial cross sectional view of FIG. 2A illustrating that the digits of the internal and external bearing elements form concentrically arranged annular digits in an interdigitated mating relation.

Figure 13:
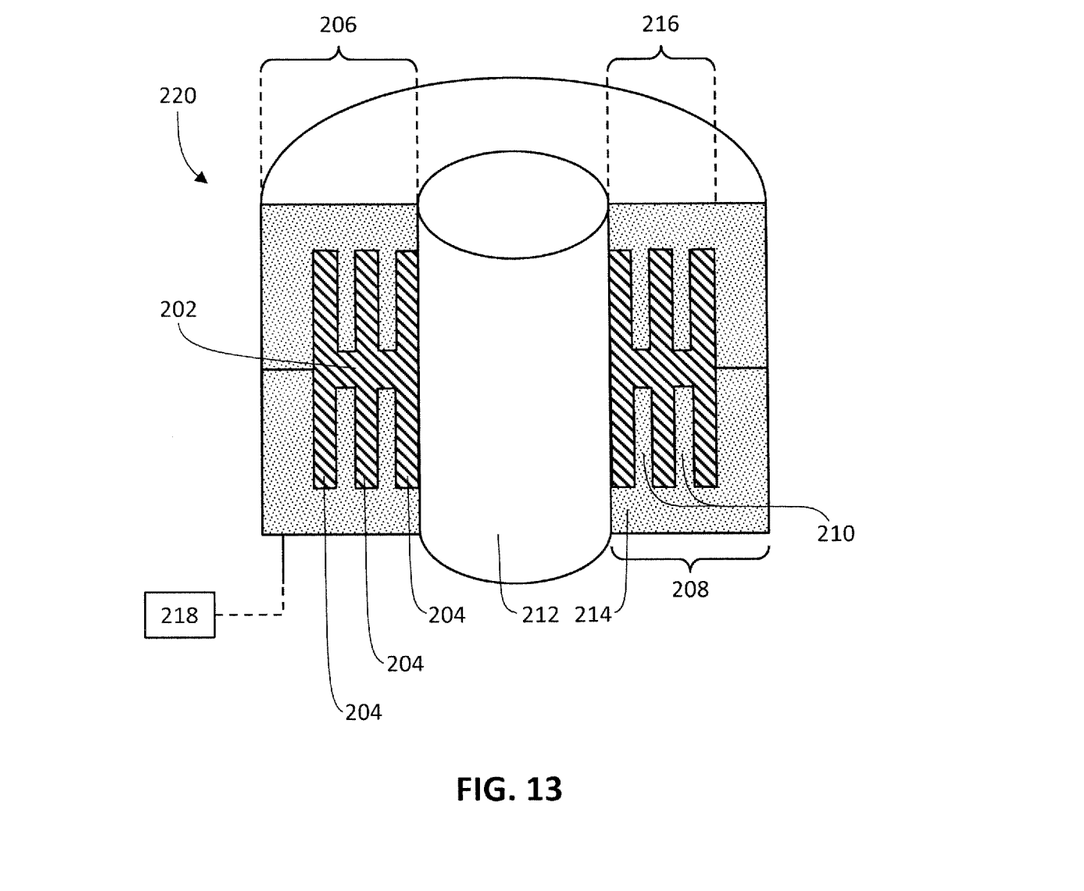
FIG. 13 is a longitudinal cross sectional view of an embodiment comprising an internal load bearing member having three digits interdigitated with an external load bearing member.

FIG. 13 shows an assembly 220 comprising a pair of external load bearing members 206, 208. The external load bearing members further comprise a plurality of digits 210 joined by a linking portion 214. Furthermore, the digits 210 are spaced apart and define a cavity adapted to receive digits of an internal load bearing member 216 having a plurality of digits 204 in an interdigitated mating relation with digits of the external load bearing member. The assembly may further comprise a controller 218 in electronic controlling communication with the internal load bearing member or the external load bearing member. The controller may be adapted to control an electric or a magnetic field strength.

Figure 5:
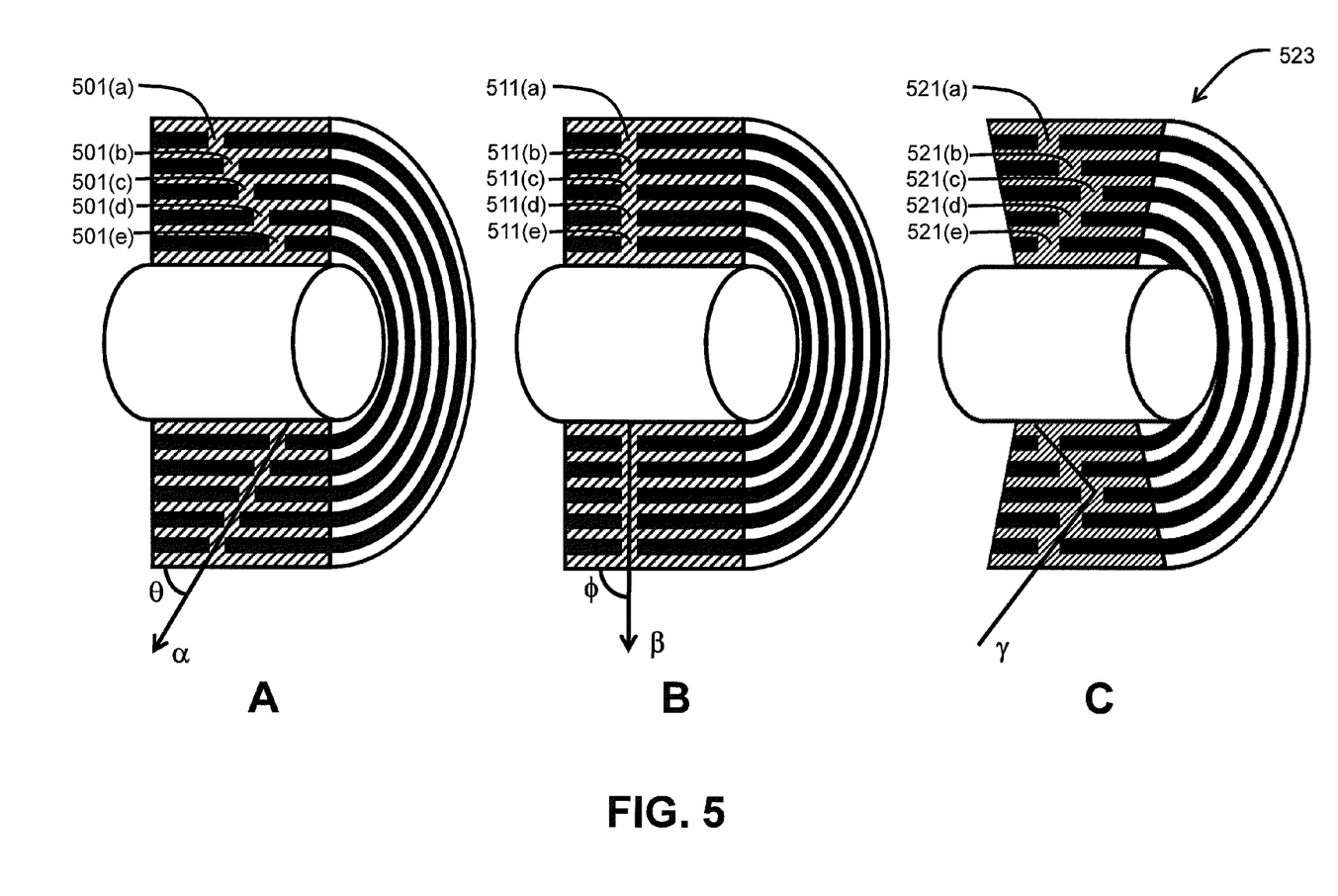
FIG. 5A is a longitudinal cross sectional view of a radial bearing embodiment comprising internal bearing elements linked by staggered linking portions.
FIG. 5B is a longitudinal cross sectional view of a radial bearing embodiment comprising internal bearing elements linked by aligned linking portions.
FIG. 5C is a longitudinal cross sectional view of a radial bearing embodiment comprising internal bearing elements linked by staggered linking portions.

FIG. 5 shows internal bearing elements of three embodiments each having digits joined by linking portions that are arranged according to predetermined patterns. In FIG. 5A the linking portions 501(a), 501(b), 501(c), 501(d), and 501(e) are each longitudinally offset from each other. More specifically, moving radially outward from the center, the linking portions move to the left of FIG. 5A at a constant rate and defining a line "a" having an angle θ relative to the central bearing of less than 90 degrees. In contrast, FIG. 5B shows the linking portions 511 aligned and forming a linear pattern β having an angle φ of 90 degrees relative to the central bearing. Finally, in FIG. 5C the linking portions 521(a), 521(b), 521(c), 521(d), and 521(e) arranged to define an angular trace γ comprising a pair of line segments arranged at an angle relative to each other and relative to the central bearing. Furthermore, FIG. 5C also illustrates that the side faces 523 of an internal bearing element need not define right angles, but rather may be at oblique angles relative to the central bearing.

Figure 6:
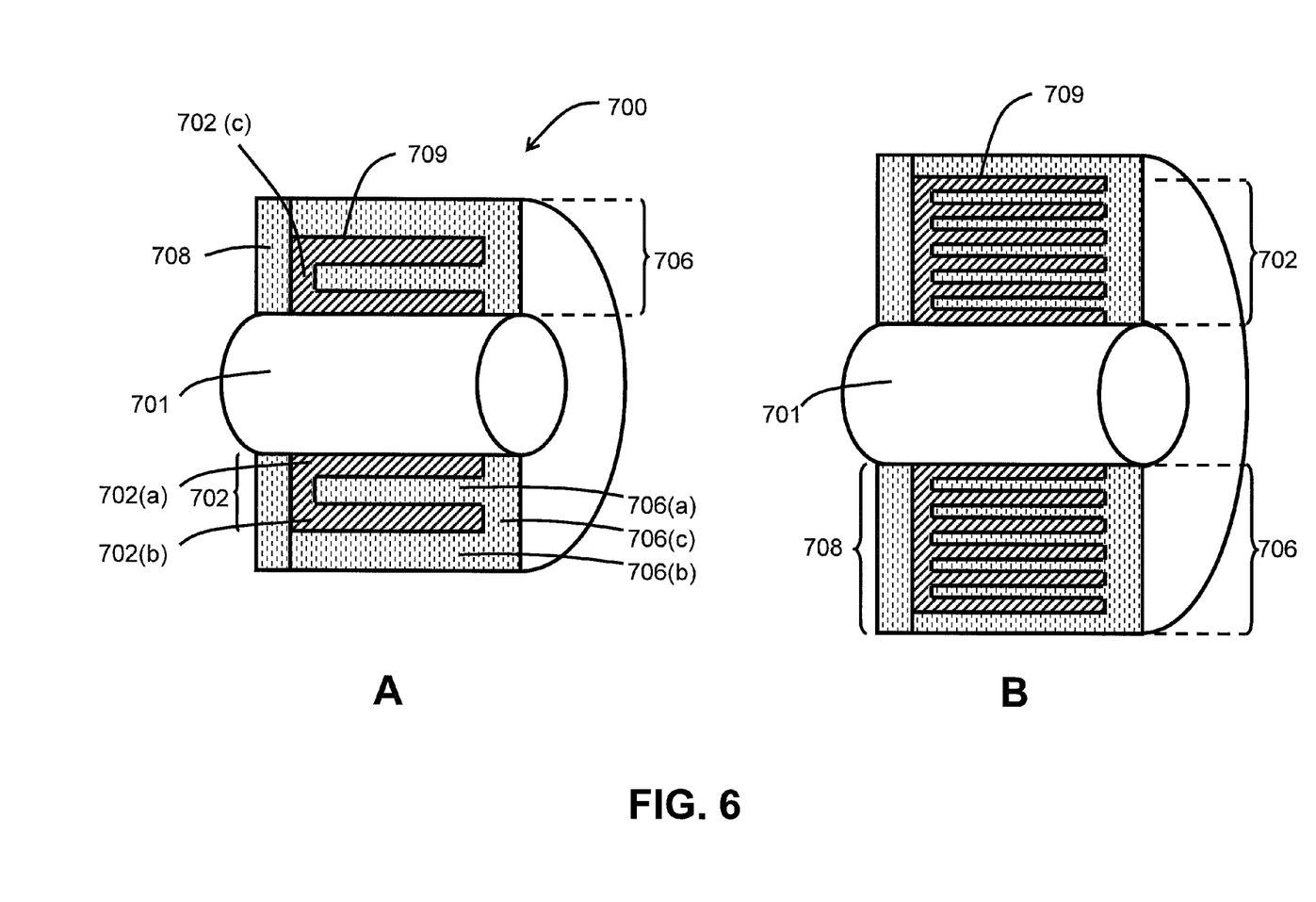
FIG. 6A is a longitudinal cross sectional view of an asymmetric radial bearing embodiment.
FIG. 6B is a longitudinal cross sectional view of an asymmetric radial bearing embodiment comprising an internal bearing element having six digits.

FIG. 6A is a longitudinal cross sectional drawing of an asymmetric radial bearing embodiment. Such embodiments can comprise an internal bearing element 702 having a central longitudinal through hole receiving a central bearing element 701. The internal bearing element 702 comprises an innermost first annular internal bearing digit 702(a) and a second annular bearing digit 702(b). The two annular internal bearing digits 702(a), 702(b) are spaced apart by a predetermined distance defined by a linking portion 702(c). The space between the first and second annular internal bearing digits receives a first annular external bearing digit 706(a) of the external bearing element 706. The internal and external bearing elements are thus in an interdigitated relation and are spaced apart by a gap 709. Accordingly, the internal and external bearing elements do not contact each other. A second annular external bearing digit 706(b) defines an outer face of the bearing. A backing member 708 mates with the second digit 706(b) of the external bearing member 706 and encloses the internal bearing member 102. FIG. 6B illustrates a similar asymmetric radial bearing embodiment having a larger number of digits, which is adapted to bear a correspondingly larger radial load. Specifically, the embodiment shown in FIG. 6B includes an internal bearing element 702 having six coaxial annular digits.

Figure 7:
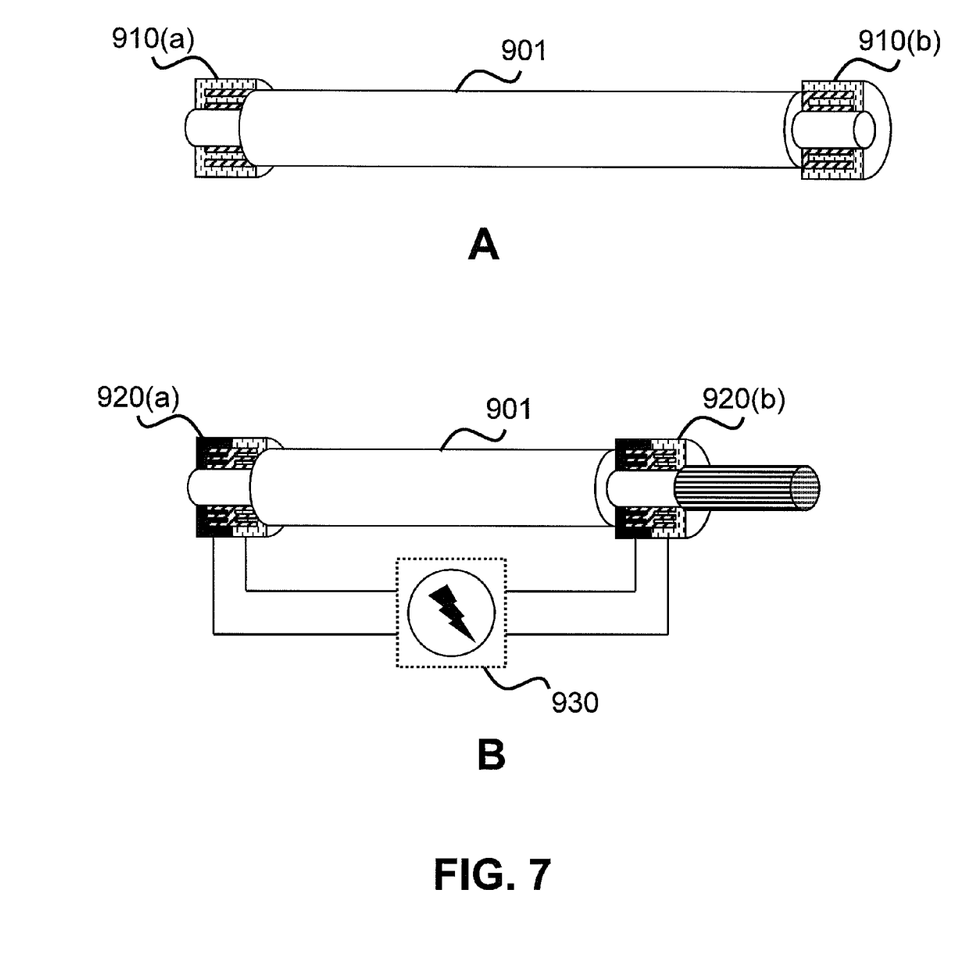
FIG. 7A is a drawing of a first coupling device and shaft embodiment.
FIG. 7B is a drawing of a second coupling device and shaft embodiment.

FIG. 7A is a drawing of an embodiment comprising a shaft 901 having a pair of asymmetric compact non-contact load bearing devices 910(a), 910(b) at either end. According to this embodiment the shaft 901 can rotate while being vertically supported by the load bearing devices 910(a), 910(b). Furthermore, according to some embodiments the rotational motion of the shaft 901 can be caused, controlled, or stopped by the action of the load bearing devices 910(a), 910(b). FIG. 7B is a drawing of a similar embodiment having a shaft 901 and a pair of load bearing devices 920(a), 920(b) at either end. This embodiment also shows a power supply 930 associated with the load bearing devices 920(a), 920(b).

Figure 8:
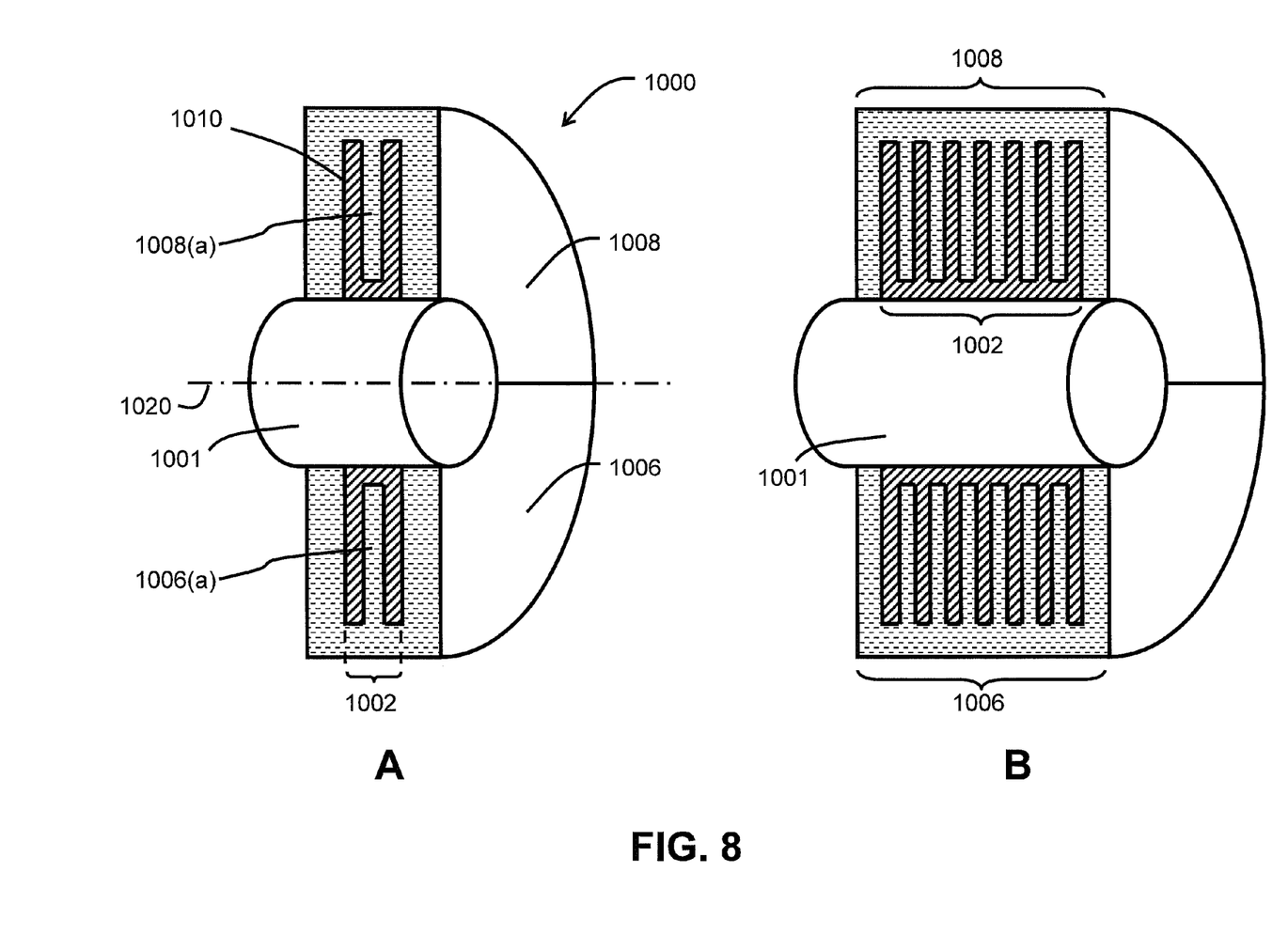
FIG. 8A is a longitudinal cross sectional view of a thrust bearing assembly embodiment.
FIG. 8B is a longitudinal cross sectional view of a thrust bearing assembly embodiment comprising an internal bearing element having seven digits.

FIG. 8A is partial longitudinal cross sectional view of a thrust bearing embodiment 1000. This embodiment comprise a cylindrical central bearing element 1001 received by an internal bearing element 1002 having a central through hole adapted to receive the central bearing 1001. The internal bearing element 1002 comprises two annular digits spaced apart and adapted to receive digits 1006(a), 1008(a) of mating external bearing elements 1006, 1008. The internal and external bearing elements are separated by a gap 1010 and therefore do not contact each other. According to this embodiment, the bearing is adapted to bear a thrust load along longitudinal axis 1020, while allowing rotation about the longitudinal axis. FIG. 8B illustrates a similar embodiment having a larger number of digits, which is adapted to bearing a correspondingly larger thrust load. Specifically, according to FIG. 8B the embodiment includes seven internal bearing digits 1002(a).

Figure 9:
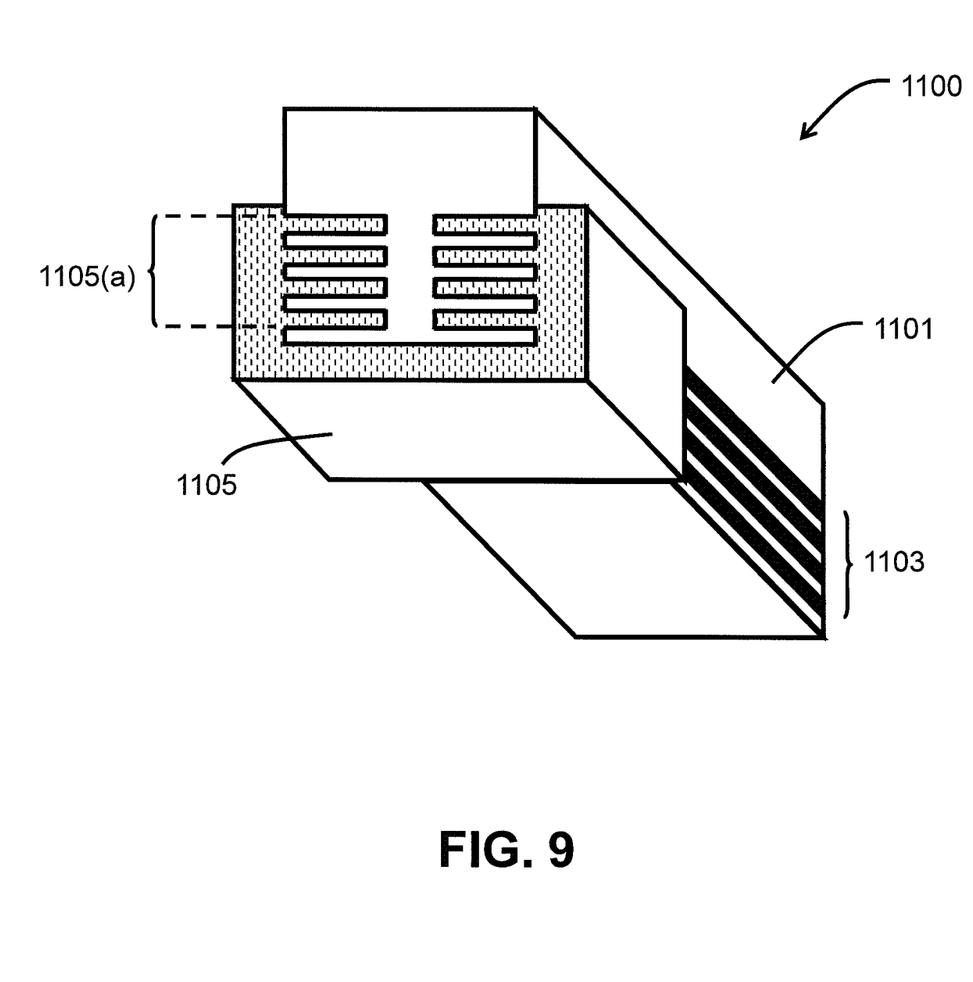
FIG. 9 is a perspective view drawing of a linear motion bearing assembly.

FIG. 9 is a perspective view drawing of a linear motion embodiment 1100. This embodiment comprises a rail member 1101 and a carriage member 1105. The rail member defines a group of recessed digits 1103 running longitudinally along two opposing sides of the rail member 1101. The carriage member 1105 similarly defines a group of digits 1105(a) adapted to mate with the digits 1103 of the rail member in an interdigitated relation. Accordingly, the carriage member 1105 is adapted to slide longitudinally on the rail member 1101. Similar to the preceding embodiments supra, the present embodiment 1100 includes a gap between the rail member 1101 and the carriage member 1105. More specifically, the gap is disposed between the digits 1103, 1105(a) of the rail and carriage members 1101, 1105.

Figure 10:
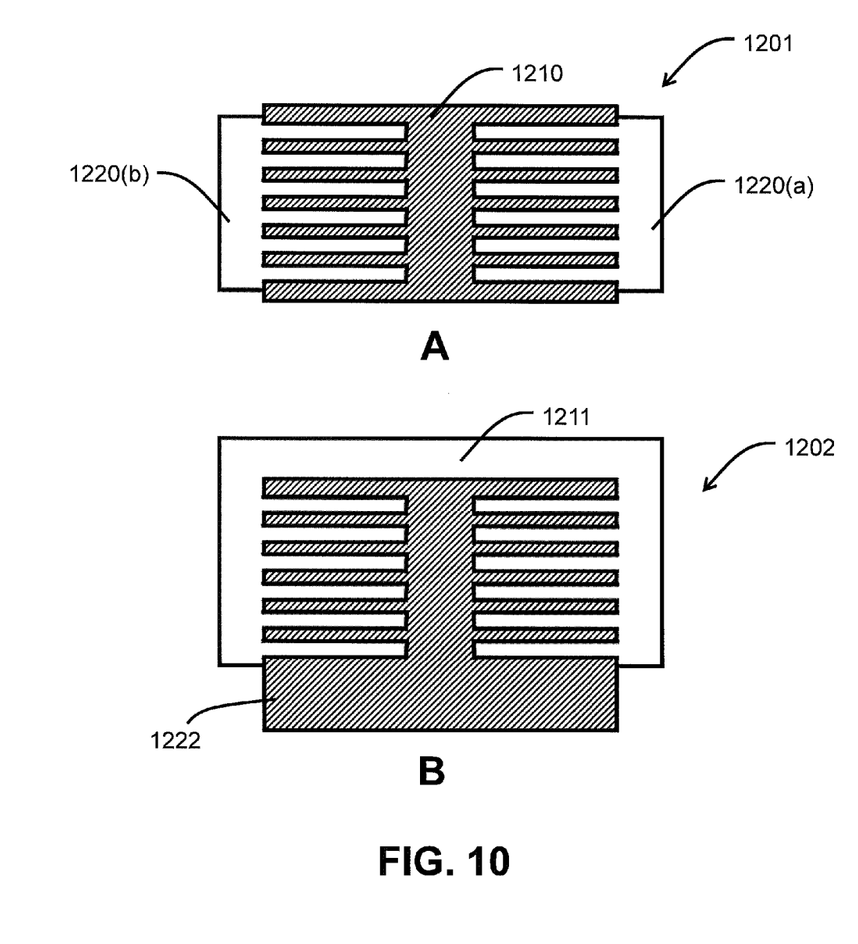
FIG. 10A is a radial cross sectional view of a first linear motion embodiment.
FIG. 10B is a radial cross sectional view of a second linear motion embodiment.

FIG. 10A and FIG. 10B illustrate alternative linear motion embodiments. According to FIG. 10A, a linear motion embodiment comprises a carriage member 1210 centrally disposed within a pair of rail members 1220(a), 1220(b). FIG. 10B shows a linear motion embodiment comprising an external carriage 1211 surrounding a centrally disposed rail member 1222.

Figure 11:
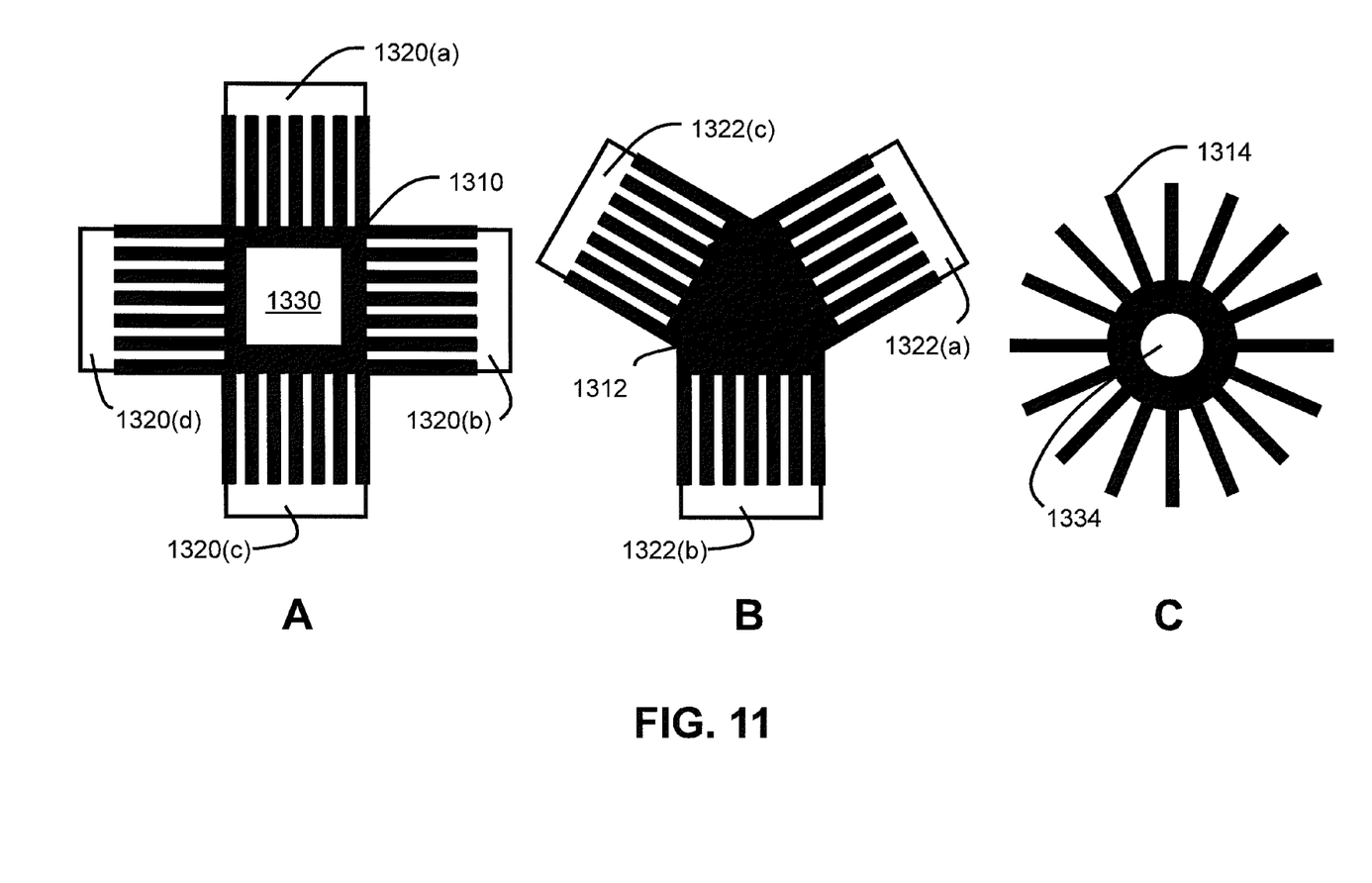
FIG. 11A is a radial cross sectional view a combination embodiment comprising four bearings.
FIG. 11B is a radial cross sectional view a combination embodiment comprising three bearings arranged at about 120 degrees to each other.
FIG. 11C is a radial cross sectional view an embodiment comprising a star-shaped bearing.

FIG. 11 illustrates three alternative linear motion embodiments. FIG. 11A includes a carriage member 1310 having four sets of digits for receiving four separate rail members 1320(a), 1320(b), 1320(c), and 1320(d). The carriage member 1310 further defines a central through hole 1330 adapted, for instance, to receive a shaft having a square cross section. In some variations of this embodiment, the carriage can be rotated by turning the square shaft. FIG. 11B illustrates an embodiment having a central carriage member 1312 defining three equally spaced groups of digits for receiving three rail members, 1322(a), 1322(b), and 1322(c). Finally, FIG. 11C illustrates an embodiment comprising a circular central carriage member 1314 defining a plurality of radial digits equally spaced about the circumference. The embodiment of FIG. 11C further defines a central through hole 1334, which can, for instance, receive a shaft having a circular cross section. Accordingly, some embodiments move both linearly and rotationally.

Figure 12:
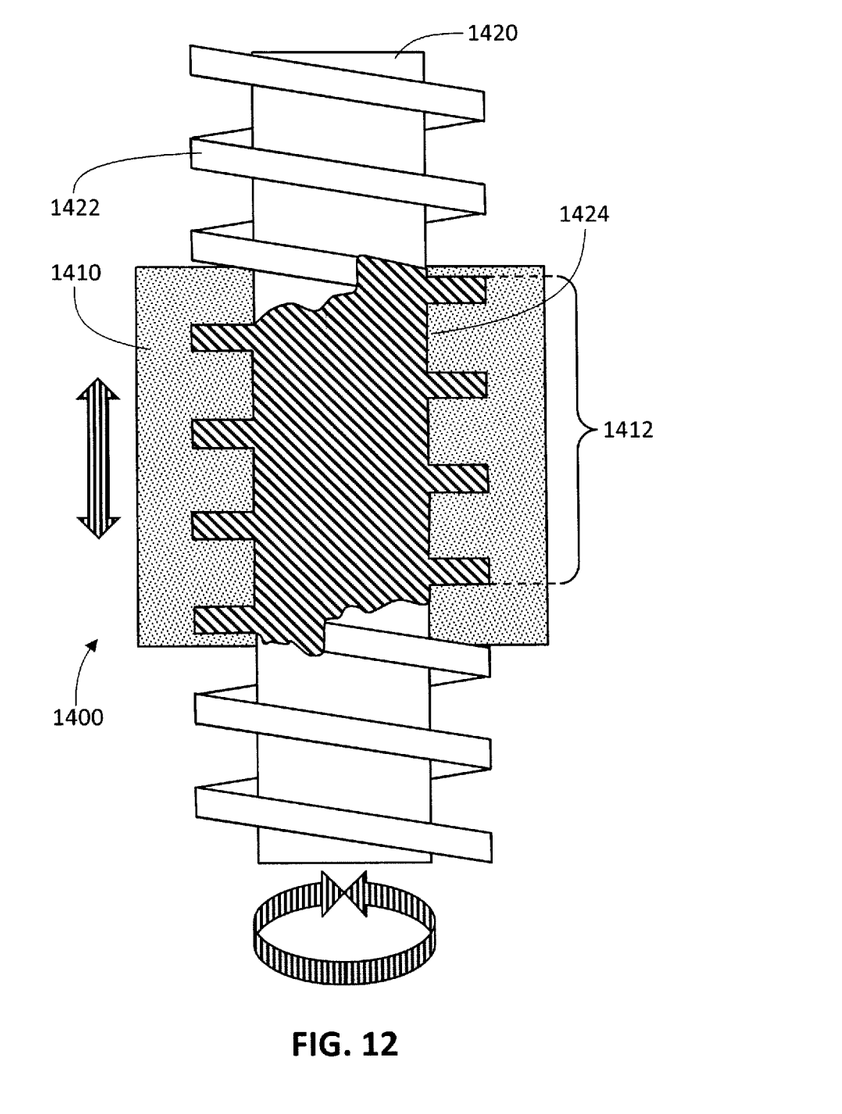
FIG. 12 is a cross-sectional view of an embodiment comprising a lead screw.

FIG. 12 shows a cross-sectional view of an embodiment comprising a lead screw 1400. According to this embodiment an external nut element includes a female thread 1422 defining a helical space for receiving a lead screw 1420. The threads 1422 of the lead screw 1420 mate with portions of the female thread while maintaining a gap between the male and female threads. The gap is maintained between the lead screw 1420 and the threads 1422, for example, by applying an electric and/or magnetic field through the lead screw 1420 to the nut 1410, or through the nut 1410 to the lead screw 1420. Thereby the field can drive the rotational motion of the nut 1410 or the lead screw 1420. In some embodiments a controller is in electronic controlling communication with lead screw 1420 or the nut 1410, and is adapted to cause the generation of a field for driving the motion of the lead screw 1420.

Various embodiments have been described, hereinabove. It will be apparent to those skilled in the art that the above methods and apparatuses may incorporate changes and modification without departing from the general scope of this invention. It is intended to include all such modifications and alterations in so far as they come within the scope of the appended claims or equivalents thereof.

Having described the invention, it is now claimed:

I claim:

1. A compact non-contact load bearing device, comprising:
    an internal load bearing member having a plurality of digits joined by a linking portion, the linking portion defining a space between adjacent digits, the space having a predetermined thickness and shape;
    at least one external load bearing member having a plurality of digits joined by a linking portion, the linking portion defining a cavity between adjacent digits, said cavity adapted to receive a digit of the internal load bearing member such that the internal load bearing member mates with the external load bearing member in an interdigitated relation while leaving a gap between interdigitated surfaces of the internal load bearing member and the external load bearing member; and
    a means for maintaining the gap.

2. The device of claim 1, wherein the gap has a distance from about $10^{-2}$ m to about $10^{-12}$ m.

3. The device of claim 1, wherein the internal load bearing member, the external load bearing member or both comprise between about 2 to about $10^6$ digits.

4. The device of claim 1, wherein the thickness of the digits in the internal load bearing member or the external load bearing member is from about $10^{-2}$ m to about $10^{-12}$ m.

5. The device of claim 1, wherein the means for maintaining the gap is selected from the group consisting of a hydrostatic fluid, a hydrodynamic fluid, an electrorheological fluid, a magnetorheological fluid, an electric field, and a magnetic field.

6. The device of claim 1, wherein the digits in the internal load bearing member and the external load bearing member are in an annular configuration.

7. The device of claim 1, wherein the digits in the internal load bearing member and the external load bearing member are in a planar configuration.

8. The device of claim 1, wherein the internal load bearing member comprises a lead screw, and wherein the external load bearing member comprises a female thread for receiving the lead screw.

9. The device of claim 1, wherein the internal load bearing member and the external load bearing member are comprised of a material independently selected from the group consisting of organic polymers, ceramics, graphite, silicates, borates, copper, brass, bronze, aluminum, gold, and steel.

10. The device of claim 9, wherein the material comprising one of the internal load bearing member or the external load bearing member is a porous material.

11. The device of claim 1, wherein the device is a device selected from the group consisting of a radial bearing, a thrust bearing, a hydrostatic bearing, a hydrodynamic bearing, a frictionless bearing, a damping device, a mechanical coupling device, a clutch, a lead screw and a linear motion device.

12. The device of claim 11, wherein the means for maintaining the gap is selected from the group consisting of a hydrostatic fluid, a hydrodynamic fluid, an electrorheological fluid, a magnetorheological fluid, an electric field, and a magnetic field.

13. The device of claim 12, wherein the means is a fluid selected from the group consisting of an electrorheological fluid and a magnetorheological fluid, and wherein the fluid substantially fills the gap.

14. The device of claim 12, further comprising a controller in electronic controlling communication with the internal bearing member or the external bearing member, said controller adapted to control an electric or a magnetic field strength.

15. The device of claim 1, wherein the internal load bearing member comprises a plurality of linking portions offset longitudinally from each other.

16. The device of claim 1, wherein the internal and external bearing members are adapted to linearly translate relative to each other and to rotate as one body about a predetermined axis.

17. A device, comprising: a plurality of devices according to claim 1, the plurality of devices arranged in a configuration selected from the group consisting of an arrangement in parallel, in series, and a portion in parallel and a portion in series.

* * * * *